Figure 1:
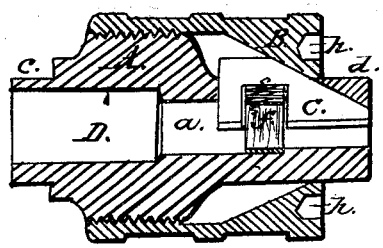

G. E. Brettell,

Chuck.

No. 90,338.  Patented May 25, 1869.

Witnesses:
Charles A. Chapin
Thos. S. Grover

Inventor:
George E. Brettell

GEORGE E. BRETTELL, OF ROCHESTER, NEW YORK.

Letters Patent No. 90,338, dated May 25, 1869.

IMPROVEMENT IN CHUCKS.

The Schedule referred to in these Letters Patent and making part of the same.

*To all whom it may concern:*

Be it known that I, GEORGE E. BRETTELL, of Rochester, in the county of Monroe, in the State of New York, have invented an Improved Self-Centring Chuck; and I do hereby declare that the following is a full, clear, and exact description of the construction and operation of the same, reference being had to the accompanying drawings, making a part of this specification, in which—

Figure 1 is a central sectional view of my invention.

To enable others to make and use my invention, I will describe its construction and operation.

The chuck is composed of the part A, the cap B, the jaws C, of which there are three, the ferrule $f$, and the spiral springs $s$, of which there is one for each jaw. The part A is slotted, to receive the jaws C.

The ferrule $f$ is driven into the hole $a$, to the position shown. The springs $s$ are then placed in the holes which are made to receive them, an equal part of each hole being on each side of the slots which receive the jaws.

The jaws C are then placed in their proper position in the slots. The cap B is then screwed on. It compresses the spiral springs $s$, and closes the jaws C, and as it is screwed off, the spiral springs $s$ throw the jaws open.

The ferrule $f$ keeps the springs $s$ in their places, and clear from dirt.

The tapering hole D is to receive the shank, which is to connect the chuck to the spindle of the machine in which the chuck is to be used.

Two sides of the part A, near the end, at $c$, are flattened, so as to apply an open wrench, for the purpose of quickly taking it out of the spindle of the machine in which it is being used.

The same wrench has two pins attached in such places that when the open part of the wrench is slipped over the end of the part A, at $d$, they will enter the holes $h$, and, by turning with the hand, will open and close the jaws with force.

Claim.

In self-centring chuck, closed by movable inclines, I claim the construction and arrangement of the slotted jaws C, ferrules $f$, and springs $s$, as and for the purpose specified.

GEORGE E. BRETTELL.

Witnesses:
CHARLES A. CHAPIN,
THOS. S. GROVER.